US012792777B1

(12) United States Patent
Goel et al.

(10) Patent No.: US 12,792,777 B1
(45) Date of Patent: Nov. 10, 2026

(54) ADAPTIVE GENERATIVE MODEL RESPONSE AND RESOURCE PROVISION

(71) Applicant: T-Mobile USA, Inc., Bellevue, WA (US)

(72) Inventors: Ayush Goel, Bellevue, WA (US); Kiran Kumar Komaravolu, Bellevue, WA (US); Jai Devinder S. Matharoo, Herndon, VA (US); Anandajothi Muttayane, Renton, WA (US); Vikas Ranjan, Bellevue, WA (US); Richard B.N. Thorne, Zanesville, OH (US); Krishna Prakash Venkata, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 19/204,828

(22) Filed: May 12, 2025

(51) Int. Cl.
*H04L 29/06* (2006.01)
*G06F 21/62* (2013.01)

(52) U.S. Cl.
CPC .. *G06F 21/6254* (2013.01); *G06F 2221/2141* (2013.01)

(58) Field of Classification Search
CPC ..................... G06F 12/6254; G06F 2221/2141
See application file for complete search history.

(56) References Cited

U.S. PATENT DOCUMENTS

| | | | |
|---|---|---|---|
| 7,162,473 | B2 | 1/2007 | Dumais et al. |
| 7,467,401 | B2 | 12/2008 | Cicchitto |
| 8,799,489 | B2 | 8/2014 | Suen et al. |
| 9,690,931 | B1 | 6/2017 | Anantharaju et al. |
| 9,948,655 | B1 | 4/2018 | Gerweck |
| 9,965,757 | B2 | 5/2018 | Bhinder |
| 10,044,723 | B1 | 8/2018 | Fischer et al. |
| 10,091,230 | B1 | 10/2018 | Machani et al. |
| 10,235,780 | B2 | 3/2019 | Noon et al. |
| 2002/0023091 | A1 | 2/2002 | Silberberg et al. |
| 2021/0182709 | A1* | 6/2021 | Manchanda ...... G06F 16/24575 |

(Continued)

FOREIGN PATENT DOCUMENTS

| | | | |
|---|---|---|---|
| CN | 104205086 | B | 3/2017 |
| EP | 2724280 | A2 | 4/2014 |

(Continued)

*Primary Examiner* — Wasika Nipa

(74) *Attorney, Agent, or Firm* — Ashurst Perkins Coie US LLP

(57) ABSTRACT

Systems and methods for adaptively producing a model response based on resource provision restrictions are disclosed herein. In some aspects, a system receives a user query at a model that requires access to sources for the model to generate a response and also receives user profile data. The system determines a subset of the plurality of sources at a knowledge base and processes, using the model, the user query and the subset to generate a preliminary response. The system determines whether the user device is authorized to access data from a source and responsive to determining that the user device is authorized to access data from a first source, automatically triggers provisioning of the first source at the user device. Responsive to determining that the user device is not authorized to access data from a second source, the system generates a filtering instruction to modify the preliminary response.

20 Claims, 11 Drawing Sheets

(56) References Cited

U.S. PATENT DOCUMENTS

| | | | | |
|---|---|---|---|---|
| 2022/0405580 | A1 | 12/2022 | Zheng et al. | |
| 2024/0202221 | A1* | 6/2024 | Siebel | G06F 16/3326 |
| 2026/0141089 | A1* | 5/2026 | Maripuri | G06F 21/604 |
| 2026/0154432 | A1* | 6/2026 | Krishnan | G06F 21/6218 |

FOREIGN PATENT DOCUMENTS

| | | | |
|---|---|---|---|
| EP | 2973026 | A2 | 1/2016 |
| WO | 2021061159 | A1 | 4/2021 |

* cited by examiner

400

```
provisioning_request{
    prompt: "I want to provision data from a database storing call center
    data for all time"
    user_profile_data{
        user_id: "thisisjohndoe"
        user_access_level: 2
    }
    device_data{
        device_imei: 476587346587345
        IP_address: 192.168.1.45
        os: "android"
    }
}
```

*FIG. 4*

500 response{
text: "Hi John Doe, it looks like you are trying to provision a database with call center data.
I found the found the following databases that match your request:
- call_database_records_analytics_database – this is a database storing device metrics relating to devices that experienced poor connectivity.

Here is an entry from this database:

| **device_imei** | **issue_txt** | **timestamp** | **date** |
|---|---|---|---|
| '12383432234' | Experiences call drop issues. | 12:34:34 | 1/1/2022 |

- call_center_records – this is a large database storing CDRs
I can show you a sample entry, but unfortunately, your access level does not enable you to see actual values or provision this data.

| **call_identifier** | **caller_number** | **callee_number** | **start_time** |
|---|---|---|---|
| XXXXXXXXX | XXXXXXXXX | XXXXXXXXX | XXXX-XX-XX:XX:XX:XX |

Can you confirm which database you'd like to provision?
}

*FIG. 6*

ADAPTIVE GENERATIVE MODEL RESPONSE AND RESOURCE PROVISION

BACKGROUND

A telecommunications network is established via a complex arrangement and configuration of many cell sites deployed across a geographical area. For example, there can be different types of cell sites (e.g., macro cells, micro cells, and so on) positioned in a specific geographical location, such as a city, neighborhood, and so on. These cell sites strive to provide adequate, reliable coverage for mobile devices (e.g., smartphones, tablets, and so on) via different frequency bands and radio networks such as a Global System for Mobile (GSM) mobile communications network, a code/time division multiple access (CDMA/TDMA) mobile communications network, a third, fourth, or fifth generation (3G/4G/5G) mobile communications network (e.g., General Packet Radio Service (GPRS)/enhanced GPRS ((EGPRS), Enhanced Data rates for GSM Evolution (EDGE), Universal Mobile Telecommunications System (UMTS), or long-term evolution (LTE) network), Institute of Electrical and Electronics Engineers (IEEE) 802.11 (Wi-Fi), or other communications networks. The devices can seek access to the telecommunications network for various services provided by the network, such as services that facilitate the transmission of data over the network and/or provide content to the devices.

Networks such as these facilitate communications between millions of devices, including communications that enable the provisioning of resources for countless devices. In particular, such communications enable configuration and allocation of necessary resources, such as hardware, software, storage, or network components, for usage at applications and entity systems.

BRIEF DESCRIPTION OF THE DRAWINGS

Detailed descriptions of implementations of the present invention will be described and explained through the use of the accompanying drawings.

FIG. 4 is a block diagram illustrating an example data structure for a request for provisioning resources, in accordance with embodiments herein.

FIG. 6 is an example of a response, in accordance with embodiments herein.

Figure 1:
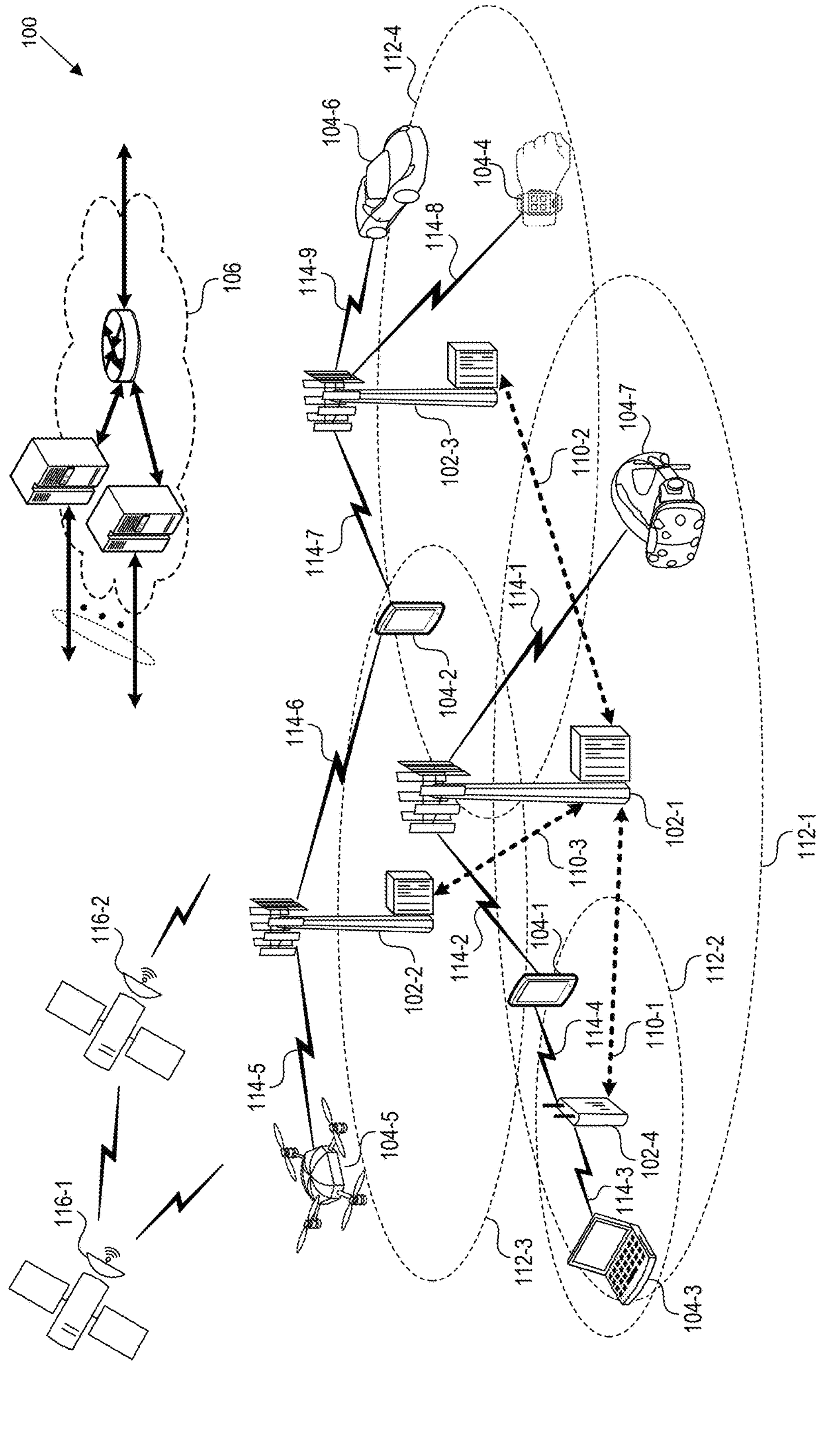
FIG. 1 is a block diagram illustrating a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Provisioning, such as in the context of cloud computing, enables resources such as virtual machines, containers, databases, or storage, to be configured and allocated for usage at systems or applications to function properly. Because of this, provisioning is a key aspect of many deployed applications across different industries. For example, operators can provision compute instances to run a web application during deployment and can similarly provision storage for processed data. Similarly, operators can provision a hospital end device with medical data. Doing so ensures that applications and users have access to the computing power and connectivity needed to run efficiently. Thus, provisioning such resources is crucial for ensuring performance, availability, and security across environments.

However, while provisioning is a crucial aspect of many applications, identifying the appropriate resources for provisioning has remained a bottleneck in conventional systems. For example, many conventional systems rely on static infrastructure whereby a user requesting to provision resources must work with an operator to communicate and identify the appropriate resources needed. This often requires multiple passes with an operator to attempt and narrow down the possible field of resources to a select subset that the user needs. Not only does doing so introduce latency and slow down the deployment process for many applications, but it also poses a security risk as multiple vectors of communication are established through which data can be leaked. Conventional methods that rely on communication with an operator often require more data regarding the provisioning resources than is necessary. Especially in the case where medical data needs to be provisioned, communication back and forth regarding the nature of the data can be in direct violation of multiple regulatory requirements.

Furthermore, conventional systems perform the process of identification of appropriate resources and configuration of resources serially, that is, identification must occur before configuration. However, doing so introduces a large amount of latency for an end user, as the user can be required to wait after identification for the configuration to take place. Accordingly, a mechanism is desired that enables a more efficient and secure method of identifying and configuring resources for provisioning. In particular, systems and methods disclosed herein enable performance of resource identification and configuration in parallel, thereby reducing latency experienced by an end user during the provisioning process. That is, systems and methods disclosed herein leverage machine learning (ML) techniques, such as large-language models (LLMs), to work with an end user to identify the resources needed for provisioning. An exemplary model is described in further detail in reference to FIGS. 9-10. In parallel with communication with the end user to identify the specific set of resources for provisioning, the system can provision resources in parallel in order to reduce latency. Furthermore, the model can communicate with the user through prompts and responses, and based on user profile data, filter and modulate the response to prevent data that is unavailable for the user (e.g., unauthorized) from being shown to the user.

For example, the system can receive a user query requesting to have a user device provisioned for one or more resources. This can include provisioning existing resources such as data sources (e.g., databases), or provisioning for the creation of resources. The system can also receive user profile data, such as data indicative of a user's access level. The model can identify a subset of a plurality of sources, such as using a knowledge base associated with the model. For example, the knowledge base can be used to identify databases that can have the correct type of data the user needs by matching text from the user's query to one or more resources that are potentially being referenced.

The system can process, using the model, the user query and the subset of the plurality of sources to generate a preliminary response. For example, if more data is needed from the user to narrow down the scope of sources identified in the first instance by the model, the model can output a response indicating that additional data is needed and can further indicate the type of data determined to be needed. However, as discussed herein, in order to prevent data leakage and to ensure security of information flow, the model can modulate the response to the user so as to prevent unauthorized data (e.g., data the user does not have access to based on their profile data) from being sent to the user. In order to do so, for each source of the subset, the system can determine whether the user device is authorized to access data from the source based on the user profile data.

Responsive to determining that the user device is authorized to access data from a first source of the subset of the plurality of sources, the system can automatically trigger provisioning of the first source at the user device. By provisioning resources that a user is authorized to access automatically, even prior to narrowing down and identifying the source ultimately being requested by the user device, the system can conserve time needed to configure and provision such that the user at the end device experiences little to no latency when accessing the data. That is, the system leverages the low overhead of provisioning to reduce latency experienced by the user.

Responsive to determining that the user device is not authorized to access data from a second source of the plurality of sources, the system generates a filtering instruction to modify the preliminary response from the model to exclude information from the second source. For example, if the preliminary response was a short description of relevant sources found and a request from an additional description from the user to narrow or confirm one or more sources, the system can generate filtering instructions to remove any personally identifiable information (PII) relating to data for a person the user does not have authorization to access. The system can then process the user query, the preliminary response, and the filtering instruction set to generate the response to the user query and generate for display at the user device the response to the user query.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Wireless Communications System

FIG. 1 is a block diagram that illustrates a wireless telecommunications network 100 ("network 100") in which aspects of the disclosed technology can be incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an IEEE 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 gigahertz (GHz) or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet of Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term "eNBs" is used to describe the base stations 102, and in 5G new radio (NR) networks, the term "gNBs" is used to describe the base stations 102 that can include mmW communications. The network 100 can thus form a heterogeneous network 100 in which different types of base stations provide coverage for various geographic regions. For example, each base station 102 provides communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station as compared to a macro cell and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 100 equipment at the edge of a network 100, including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-10 (also referred to individually as "communication link 114" or collectively as "communication links 114") shown in network 100 include uplink (UL) transmissions from a wireless device 104 to a base station 102 and/or downlink (DL) transmissions from a base station 102 to a wireless device 104. The DL transmissions can also be called forward link transmissions, while the UL transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

In some examples, the network 100 implements 6G technologies including increased densification or diversification of network nodes. The network 100 can enable terrestrial and non-terrestrial transmissions. In this context, a Non-Terrestrial Network (NTN) is enabled by one or more satellites such as satellites 116-1 and 116-2 to deliver services anywhere and anytime and provide coverage in areas that are unreachable by any conventional Terrestrial Network (TN). A 6G implementation of the network 100 can support THz communications. This can support wireless applications that demand ultra-high quality of service (QoS) requirements and multi-terabits per second data transmission in the 6G and beyond era, such as terabit-per-second backhaul systems, ultra-high-definition content streaming among mobile devices, AR/VR, and wireless high-bandwidth secure communications. In another example of 6G, the network 100 can implement a converged Radio Access Network (RAN) and core architecture to achieve Control and User Plane Separation (CUPS) and achieve extremely low user plane latency. In yet another example of 6G, the network 100 can implement a converged Wi-Fi and core architecture to increase and improve indoor coverage.

According to some implementations, the computing environment may be implemented as part of network 100. Alternatively, or additionally, the computing environment may be implemented separately from a network 100 or incorporating any combination of elements thereof.

5G Core Network Functions

Figure 2:
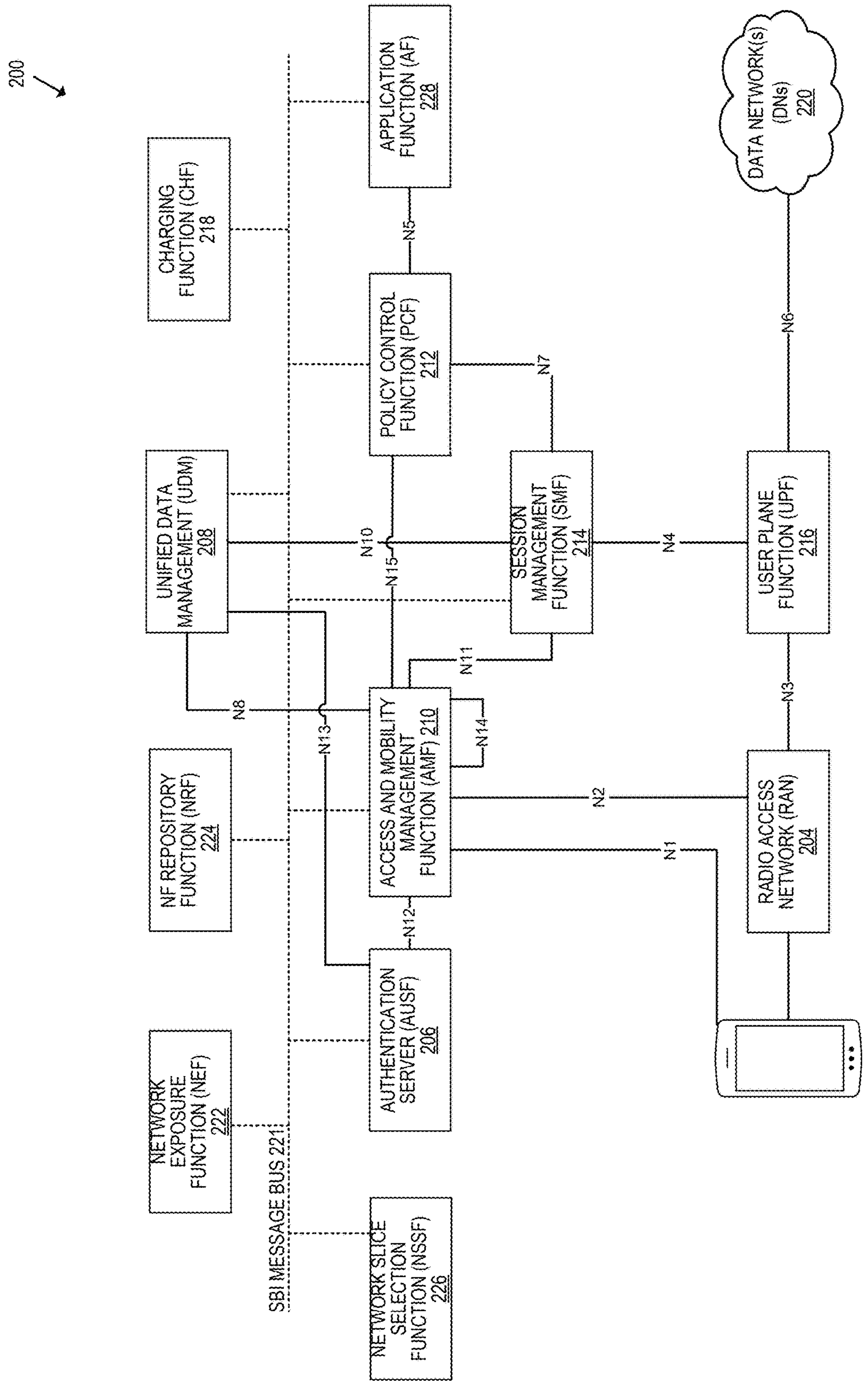
FIG. 2 is a block diagram illustrating 5G core network functions (NFs) that can implement aspects of the present technology.

FIG. 2 is a block diagram that illustrates an architecture 200 including 5G core network functions (NFs) that can implement aspects of the present technology. A wireless device can access the 5G network through a NAN (e.g., gNB) of a RAN 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service-Based Architecture (SBA) through a Service-Based Interface (SBI) 221 that uses Hypertext Transfer Protocol (HTTP)/2. The SBA can include a network Exposure Function (NEF) 222, a NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, service-level agreements, and includes the virtualized resources required to service the needs of a Mobile Virtual Network Operator (MVNO) or group of subscribers, including a dedicated UPF, SMF, and PCF. The wireless device 104 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS) and can provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208 and then provides the appropriate policy rules to the control plane functions so that they can enforce them. The SCP (not shown) provides a highly distributed multi-access edge compute cloud environment and a single point of entry for a cluster of network functions once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework that, along with the more typical QoS and charging rules, includes network slice selection, which is regulated by the NSSF 226.

Although exemplary embodiments are described herein with reference to telecommunications and networks, the concepts of the present invention are not limited in application to such networks. It will be appreciated by those of skill in the art that the concepts of the present invention can be applied outside of telecommunications and networking, such as through a single device or a cluster of remote devices.

Suitable Computing Environments

Figure 3A:
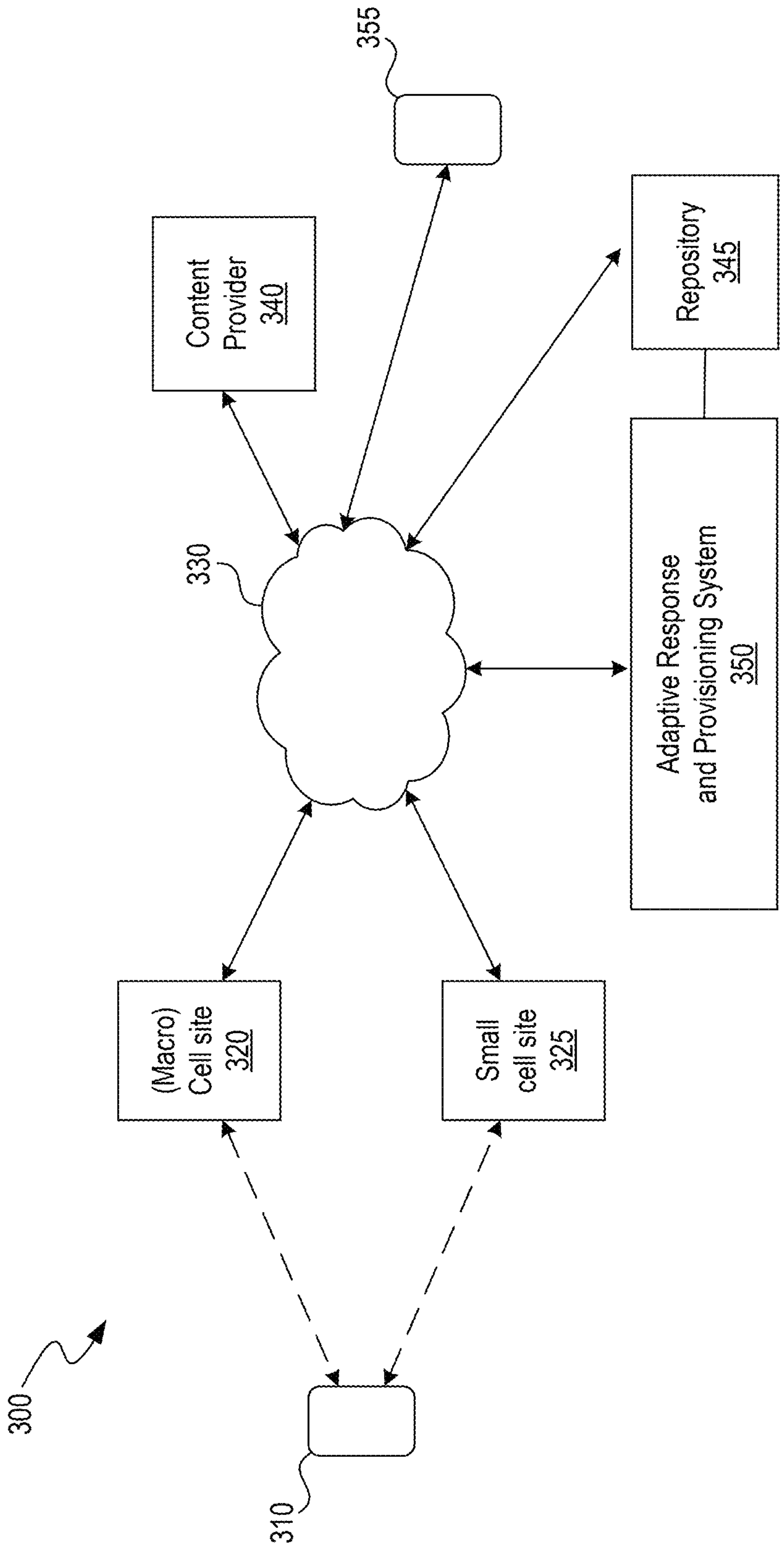
FIG. 3A is a block diagram illustrating a suitable computing environment for adaptively generating a generative model response based on resource provision restrictions, in accordance with embodiments herein.

FIG. 3A is a block diagram illustrating a suitable computing environment for adaptively generating a generative model response based on resource provision restrictions. In particular, the computing environment 300 of FIG. 3A can be used to modulate responses in different ways based on restrictions for a user on resource provisioning. A model at the environment can communicate with a user to identify resources a user needs to be provisioned and provision resources at the same time to leverage the low overhead of provisioning to minimize latency experienced by an end user or application.

Computing environment 300 can include one or more remote device(s) 310, one or more cell sites 320 and 325, a telecommunications network 330, a content provider 340, a cloud data repository 345, one or more other user devices 355, and an adaptive response and provisioning system 350. The remote device(s) 310, such as mobile devices or UE associated with users (such as VR headsets, mobile phones (e.g., smartphones), tablet computers, laptops, and so on), IoT devices, vehicles (e.g., smart vehicles), devices with sensors, and so on, can be configured to receive and transmit data, stream media content, and/or perform other communications or receive services over the telecommunications network 330, which is accessed by the remote device 310 over one or more cell sites 320, 325. For example, the remote device 310 accesses the telecommunications network 330 via a cell site at a geographical location that includes the cell site in order to transmit and receive data (e.g., stream or upload multimedia content) from various entities, such as a content provider 340, a cloud data repository 345, and/or other user devices 355 on the telecommunications network 330 and via the cell site 320.

The cell sites can include macro cell sites 320, such as base stations, small cell sites 325, such as pico cells, micro cells, or femto cells, and/or other network access components or sites. The cell sites 320, 325 can store data associated with their operations, including data associated with the number and types of connected users, data associated with the provision and/or utilization of a spectrum, radio band, frequency channel, and so on, provided by the cell sites 320, 325, and so on.

According to some embodiments, computing environment 300 can be configured to adaptively generate a generative model response based on resource provision restrictions. For example, FIG. 3A and the discussion herein provide a brief, general description of a suitable computing environment 300 in which the adaptive response and provisioning system 350 can be supported and implemented. According to some embodiments, the adaptive response and provisioning system 350 can be hosted or executed on the device or on the network.

Although not required, aspects of the adaptive response and provisioning system 350 are described in the general context of computer-executable instructions, such as routines executed by a computer, e.g., a mobile device, a server computer, or a personal computer (PC). The system can be practiced with other communications, data processing, or computer system configurations, including: Internet appliances, handheld devices (including tablet computers and/or personal digital assistants (PDAs)), IoT devices, all manner of cellular or mobile phones, multi-processor systems, microprocessor-based or programmable consumer electronics, set-top boxes, network PCs, mini-computers, mainframe computers, and the like. Indeed, the terms "computer," "host" and "host computer," and "mobile device" and "handset" are generally used interchangeably herein and refer to any of the above devices and systems as well as any data processor.

Aspects of the system can be embodied in a special-purpose computing device or data processor that is specifically programmed, configured, or constructed to perform one or more of the computer-executable instructions explained in detail herein. Aspects of the system can also be practiced in distributed computing environments where tasks or modules are performed by remote processing devices, which are linked through a communications network, such as a Local Area Network (LAN), Wide Area Network (WAN), or the Internet. In a distributed computing environment, program modules can be located in both local and remote memory storage devices.

Aspects of the system can be stored or distributed on computer-readable media (e.g., physical and/or tangible non-transitory, computer-readable storage media), including magnetically or optically readable computer discs, hard-wired or preprogrammed chips (e.g., Electrically Erasable Programmable Read-only Memory (EEPROM) semiconductor chips), nanotechnology memory, or other data storage media. Indeed, computer-implemented instructions, data structures, screen displays, and other data under aspects of the system can be distributed over the Internet or over other networks (including wireless networks), distributed on a propagated signal on a propagation medium (e.g., an electromagnetic wave(s), a sound wave, etc.) over a period of time, or provided on any analog or digital network (packet switched, circuit switched, or other scheme). Portions of the system reside on a server computer while corresponding portions reside on a client computer, such as a mobile or portable device, and thus, while certain hardware platforms are described herein, aspects of the system are equally applicable to nodes on a network. In alternative implementations, the mobile device or portable device can represent the server portion, while the server can represent the client portion.

In some implementations, the remote device 310 and/or the cell sites 320, 325 can include network communication components that enable the devices to communicate with remote servers or other portable electronic devices by transmitting and receiving wireless signals using a licensed, semi-licensed, or unlicensed spectrum over a communications network, such as the telecommunications network 330. In some cases, the telecommunications network 330 can comprise multiple networks, even multiple heterogeneous networks, such as one or more border networks, voice networks, broadband networks, service provider networks, Internet Service Provider (ISP) networks, and/or Public Switched Telephone Networks (PSTNs) interconnected via gateways operable to facilitate communications between and among the various networks. The telecommunications network 330 can also include third-party communications networks such as a GSM mobile communications network, a CDMA/TDMA mobile communications network, a 3G/4G mobile communications network (e.g., GPRS/EGPRS, EDGE, UMTS, or LTE network), a 5G mobile communications network, Wi-Fi, or other communications networks. Thus, the user device is configured to operate and switch among multiple frequency bands for receiving and/or transmitting data.

Further details regarding the operation and implementation of the adaptive response and provisioning system 350 will now be described.

Examples of Systems for Adaptive Response Production and Resource Provisioning

Figure 3B:
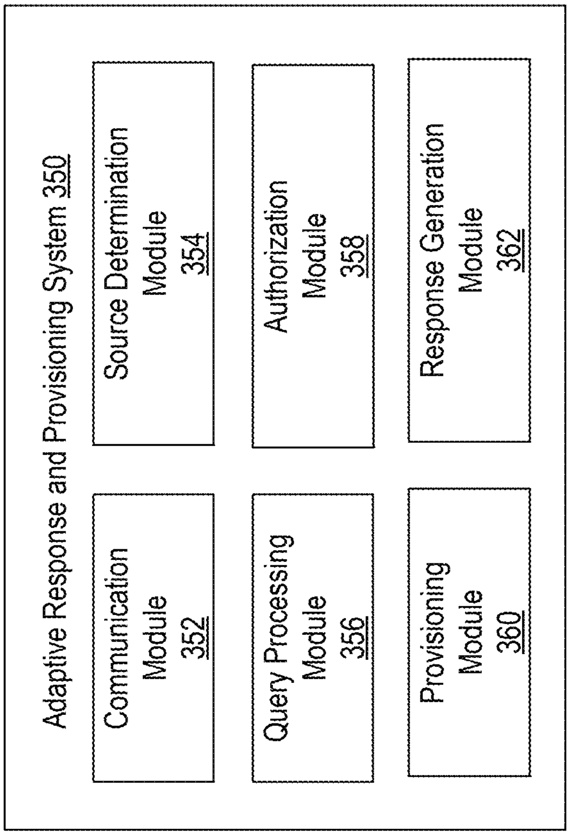
FIG. 3B is a block diagram illustrating the components of an exemplary adaptive response production and resource provisioning system, in accordance with embodiments herein.

FIG. 3B is a block diagram illustrating the components of an exemplary adaptive response and provisioning system. The adaptive response and provisioning system 350 can include functional modules that are implemented with a combination of software (e.g., executable instructions or computer code) and hardware (e.g., at least a memory and processor). Accordingly, as used herein, in some examples a module is a processor-implemented module or set of code and represents a computing device having a processor that is at least temporarily configured and/or programmed by executable instructions stored in memory to perform one or more of the specific functions described herein. For example, the adaptive response and provisioning system 350 includes a communication module 352, a source determination module 354, a query processing module 356, an authorization module 358, a provisioning module 360, and a response generation module 362, each of which is discussed separately below.

As described herein, the adaptive response and provisioning system 350 can be used to adaptively generate a generative model response based on resource provision restrictions. For example, a user at the remote device 310, or alternatively at user device 355, can communicate with the adaptive response and provisioning system 350 to identify one or more specific resources the user needs for provisioning at their device. For example, the user can prompt the system in natural language text describing the types of resources they require or necessary criteria to meet in creation or identification of a resource. A user at remote device 310 can input prompts to both identify and/or provision resources such as into a client interface on the remote device 310. In some implementations, the client interface can be backed by an application programming interface (API) endpoint that connects to a model, such as a large language model (LLM) of the adaptive response and provisioning system 350. The prompts can be used by the system to identify relevant resources until the specific resource(s) the user needs are identified, such as through narrowing of the search field or confirmation by the user through a prompt.

The system can provide the user with responses, also known as completions, that can include context for the resources identified to be relevant to the user's query and/or a request to the user for further information. As described herein, in order to maintain security, the system can be enabled to use the user profile data to determine which resources a user is authorized to access. For those the user is authorized to access, the system can automatically trigger provisioning, in order to reduce latency experienced by the user. For those the user is not authorized to access, the system can modulate the response to remove or filter information relating to those resources.

Communication Module

The communication module 352 of the adaptive response and provisioning system 350 can include software and/or hardware components allowing for the transmission and/or receipt of information between two or more devices. The communication module 352 can include a wireless communication module, such as a cellular radio or Wi-Fi antenna, to allow for communication over wireless networks and/or can additionally or alternatively include a network card (e.g., a wireless network card and/or a wired network card) that is associated with software to drive the card.

The communication module 352 is configured and/or programmed (e.g., via the above-mentioned techniques) to interface between a device (e.g., remote device(s) 310, one or more other user devices 355), cell sites (e.g., cell sites 320, 325), a content provider (e.g., content provider 340), and a cloud data repository (e.g., cloud data repository 345) such as via a network (e.g., telecommunications network 330) to receive and transmit data such as requests from devices and/or responses to those requests. In one implementation, the communication module 352 may be limited to communication with one or more devices of a user such as remote device(s) 310 and/or user devices 355.

In some implementations, the communication module 352 can further be configured to transmit requests, such as to an operator device, to provide authorization to provision one or more resources at a user device for an associated user. When the communication module 352 receives data, the module can pass on relevant portions of the data to different modules of the adaptive response and provisioning system 350. The communication module 352 can also be configured to generate and transmit notifications such as of successful provisioning.

As described herein, the communication module 352 of the adaptive response and provisioning system 350 can receive, access, or otherwise obtain, e.g., such as from one or more users at a user device 310 or other user devices 355, a request for adaptively generating a generative model response based on resource provision restrictions. For example, FIG. 4 includes an exemplary request 400 for provisioning one or more resources, also referred to herein as sources, that can be received at the communication module 352. Although specific parameters are shown in the example of FIG. 4, it should be appreciated that any combination of the illustrated parameters can be used. As referred to herein, resources can include compute resources (e.g., virtual machines, containers, serverless functions, graphics processing unit (GPU) instances, and/or batch jobs), storage resources (e.g., block storage, object storage, file storage), database resources, networking resources (e.g., Virtual Private Cloud (VPCs), subnets, load balancers, firewalls, etc.), data warehouses, data lakes, application resources (e.g., web servers, app servers, API gateways, Content Delivery Network (CDNs), Domain Name System (DNS) domains), and/or the like.

When a user at the device 310 wishes to provision resources, the user can input a query into an interface on the user device indicating information about the type of resource the user would like to provision. For example, the interface can include a client interface for a model such as an LLM chatbot. An exemplary model is described further in FIG. 8. In the example of FIG. 4, the request 400 includes a user prompt, also referred to herein as user query "I want to provision data from a database storing call center data for all time." In order to identify the correct resource, the system can be required to first access one or more sources and generate a response based on the sources. Thus, the query can require access to one or more sources of a plurality of sources in order for the model to generate a response. The request 400 can be passed, or a pointer to the data in memory can be passed, to the source determination module 354.

The request 400 can additionally include information such as user profile data for a user, which can be used by other modules to determine what information is accessible to a user, and can further include device data, which can be used by other modules to configure the resources and device for provisioning. For example, the request 400 includes user profile data including a user identifier, e.g., "thisisjohndoe," and a user access level, e.g., "2." A user identifier can include any unique alphanumeric value enabled to uniquely identify the user at the system. This data, or a pointer to the data in memory, can be passed to the query processing module 356 and the authorization module 358, where it can be used to determine whether a user is authorized to receive data from identified sources. The request 400 can also include device data such as a device IMEI, e.g., "476587346587345," an IP address "192.168.1.45," and an operating system of the device, e.g., "android." This data, or a pointer to the data in memory, can be passed to the provisioning module, where it can be used to configure either the resource, the device, or both, for provisioning.

According to some implementations, the system can store user information and/or device information locally or remotely on a repository (e.g., cloud data repository 345). In this case, rather than transmitting parameters for the device data and user profile data, the user device 310 can transmit and the system can receive a single identifier (e.g., device identifier or user identifier), which can be used to search for the remainder of the user profile data and device data stored in the repository.

According to some implementations, the system can store user information and/or device information locally or remotely on a repository (e.g., repository 345). In this case, rather than transmitting parameters for the device data and user profile data, the user device 310 can transmit and the system can receive a single identifier (e.g., device identifier or user identifier), which can be used to search for the remainder of the user profile data and device data stored in the repository.

Source Determination Module

Figure 5:
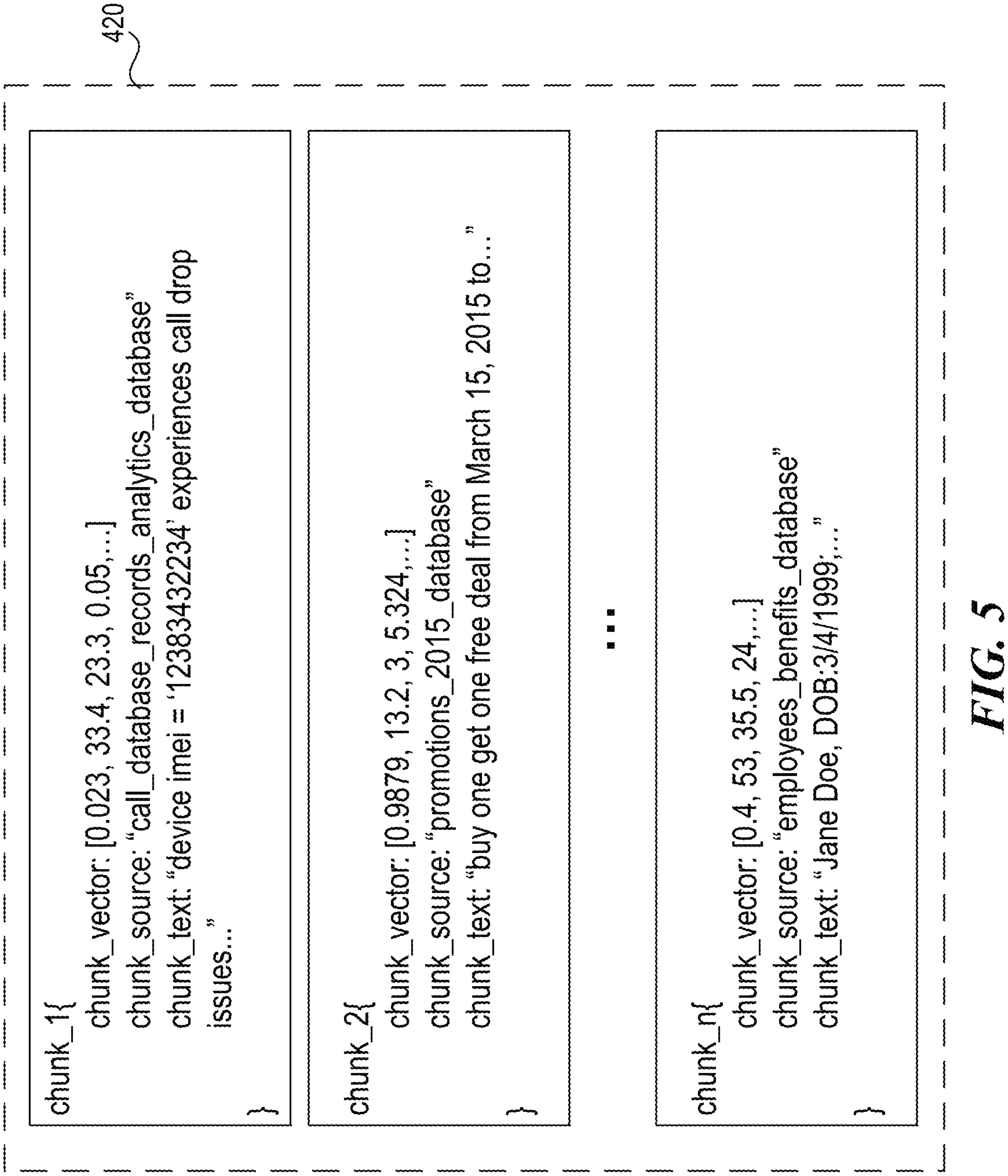
FIG. 5 is a block diagram illustrating an exemplary knowledge base that can be used for identifying resources, in accordance with embodiments herein.

The source determination module 354 can be configured to identify a subset of sources from a resource pool or provisioning repository (e.g., such as repository 345) relevant to the user prompt based on the text of the user prompt, such as through retrieval augmented generation (RAG). RAG is a technique in generative models that combines retrieval based methods with generative models to enhance the quality and relevance of generated content. In RAG, the model first retrieves relevant information from a large corpus or database and then uses this information to generate more accurate and contextually appropriate responses. This approach helps in overcoming the limitations of purely generative models by incorporating external knowledge, leading to improved performance in tasks such as question answering, dialogue systems, and content creation. In some implementations, in order to identify the subset of relevant resources, the source determination module 354 can compare the user query to chunks of data of a knowledge base such as illustrated in FIG. 5. For example, in order to identify sources associated with the user prompt, the source determination module can process the query, such as by cleaning, removing filler words, and/or embedding the query.

Source determination module 354 can then use the embedded representation of the query to search for portions of sources (e.g., chunks) that show a high level of similarity to the query. In some examples, the source determination module 354 can also use the user profile data as context. For example, if the prompt asked for provisioning of "my group's internal database" the system can identify the user group based on the user profile data and can append the additional data, e.g., the user group, onto the user prompt for context.

In particular, the model of the system can access a knowledge base 420 that stores partitions (e.g., chunks) of content from various sources in the form of embedded vector representations. For example, the knowledge base can be created by converting the content of each source into chunks and embedding each chunk into a vector representation using an embedding model. Each chunk can be stored with metadata indicating the source of the chunk and can additionally include information such as tags and a document identifier.

The embedded representation of the user prompt can be compared against the vectors of the knowledge base and a similarity metric can be used to identify the most relevant sources. In some implementations, the similarity metric can include a cosine similarity metric, Euclidean distance, dot product, hamming distance, and/or the like. For example, FIG. 5 illustrates the exemplary knowledge base 420 storing vector representations for chunks of sources such as "chunk_1," "chunk_2," and "chunk_n." Each chunk can include a vector representation of the embedded text, the source of the text, and in some instances can also include the chunk text itself. According to some implementations, the source determination module 354 can identify a subset of embedded representations of the knowledge base exhibiting a similarity metric value that exceeds a predetermined threshold when compared to the embedded representation of the user prompt.

Alternatively or additionally, the source determination module 354 can identify a fixed number of embedded representations of the knowledge base having the highest similarity metric value when compared against the embedded representation of the user prompt. In the example of FIG. 5, "chunk 1" is shown to be sourced from "call_database_records_analytics_database" and includes text such as "device imei='12383432234' experiences call drop issues . . . " whereas "chunk_2" relates to promotions from 2015, and "chunk_n" relates to employee benefits. Given that the user prompt relates to call center data, in this example, "chunk_1" can exhibit a higher similarity metric compared to "chunk_2" and "chunk_n."

For each identified embedded representation, the source determination module 354 can use the metadata of each to identify the list of sources that is most relevant to the user. For example, given "chunk_1" the source determination module 354 can identify, from the metadata, the source of the most similar chunk to be the source "call_database_records_analytics_database" among others. The source determination module 354 can pass the identified subset of sources, or a pointer to the data in memory, to the query processing module 356, which can be configured to generate a preliminary response.

Query Processing Module

As described herein, the source determination module 354 can pass the model identifier, or a pointer to the data in memory, to the query processing module 356. The query processing module 356 can be configured to process, such as using a model, the user query and the subset of the plurality of sources to generate a preliminary response. In particular, the query processing module 356 can pass the retrieved text and identified sources to a model, such as an LLM. The model can use the user query and the retrieved text (e.g., from the knowledge base) as context and output a preliminary response to the user.

According to some implementations, the adaptive response and provisioning system 350 can act as an intermediary hub that can be a centralized staging or processing layer between the original data sources and the final destinations. In this implementation, the adaptive response and provisioning system 350 can provision all of the identified subset of sources at the adaptive response and provisioning system 350 using techniques and methods described in relation to the provisioning module 360. In some implementations, the query processing module 356 can additionally pass at least a portion of the source to a model, such as an LLM. The model can use the user query and source data as context and output a preliminary response to the user. For example, the text of "chunk 1" does not provide much context regarding the source itself, e.g., "call_database_records_analytics_database." Because of this, it can be beneficial for the query processing module 356 to provision the source (e.g., "call_database_records_analytics_database") and summarize the source so as to provide the user with helpful context. In some implementations, the generative machine learning model may require access to one or more sources in order to generate the information such as a summary.

For example, the preliminary response can include a summary of each source of the subset of resources identified and request that a user confirm one or provide additional context regarding the source they wish to provision. As described herein, the preliminary response can not be suitable for transmitting back to the user device as a response. In particular, a summary of the database can include personally identifiable information. In other examples, a summary of the database can reveal internal systems, business processes, or client identities that can be sensitive information only available to those authorized to access it. Because of this, the query processing module 356 can pass the preliminary response generated by the query processing module 356 and transmit it to the response generation module 362 for applying filtering instructions for modifying the preliminary response.

Authorization Module

As described herein, although many sources can be identified to be relevant to the user's prompt, the user can not be enabled to access each. In some examples, the user can simply not be part of an access level that enables access, or alternatively or additionally, the user can be enabled to access a source with further operator authorization. Because of this, the authorization module 358 is needed to determine which sources and information the user is authorized to view and provision and which they are not. In some examples, the authorization module can determine, for each source of the subset of identified sources, whether the user device is authorized to access data from the source based on the user profile data. In particular, the authorization module can receive, such as from the communication module 352, the user identifier and/or a user access level.

The authorization module 358 can also access metadata for each source of the subset of the plurality of sources that includes access authorization data. In some implementations, the metadata can include configuration data as well. The authorization module 358 can determine whether the user device is authorized to access data from each source by comparing the user profile data to the access authorization data. For example, if the metadata indicates that only users having access level 3 or up are authorized to access data from the source, the system can determine that the user who made the request 400 who has an access level of 2 cannot access or provision the source. In some implementations, the metadata can partition the data among data accessible by different types of users. For example, a user having access level 2 can be enabled to provision and access the first seven fields for each row of data, but can not be able to access other fields.

As described herein, the authorization module 358 can go through each source of the identified subset of sources and determine whether a user device is authorized to access or otherwise provision data from the source. Responsive to determining that the user device is authorized to access data from a first source of the subset, the authorization module 358 can pass the data to the provisioning module 360, which can be used to automatically trigger provisioning of the first source at the user device. Alternatively or additionally, responsive to determining that the user device is not authorized to access data from a second source of the plurality of sources, the authorization module 358 can generate a filtering instruction to modify the preliminary response from the model to exclude information from the second source.

As referred to herein, a filtering instruction can include functions or instructions including natural language text to filter text from a preliminary response. In one implementation, the filtering instruction can include a negative prompt, such as for redacting personal identifiable information.

Provisioning Module

As described herein, the provisioning module can be used to provision facilitating of resources at the requesting device (e.g., the user device 310), such as once it is determined that a user is authorized to access the resource. Provisioning can occur in various ways. According to some implementations, as disclosed herein, the adaptive response and provisioning system 350 can act as an intermediary hub that can be a centralized staging or processing layer between the original data sources and the requesting device. In this implementation, the adaptive response and provisioning system 350 can provision all of the identified subset of sources at the adaptive response and provisioning system 350. Once it is determined that a user is authorized to access the resource, the adaptive response and provisioning system 350 can push the requested data to the requesting device.

Alternatively or additionally, the adaptive response and provisioning system 350 can not act as an intermediary hub. In this case, rather than provisioning the sources first at the adaptive response and provisioning system 350, the system can trigger provisioning directly at the requesting device, e.g., user device 310. In particular, the provisioning module can access device data such as device identifiers, IP addresses, operating system, and/or the like, from communication module 352. In the example of FIG. 4, the device data can include "device_imei: 476587346587345 IP_address: 1102.168.1.45 os: 'android'." As described herein in some implementations, each resource can include metadata with configuration data as well. In some examples, a resource can require configuring prior to provisioning. For example, some resources have OS-specific builds specific to certain operating systems, variants requiring low random-access memory-(RAM) variants, and/or other configurations that can be modified based on the specific device data for the receiving device. Thus, the provisioning module can use the configuration data and the device data to appropriately configure the resource for provisioning at the device.

Response Generation Module

The response generation module 362 can then be used to generate one or more responses to be transmitted, e.g., via communication network 330, for display at the user device 310. In particular, the response generation module 362 can receive the user query, the preliminary response, and the filtering instruction and apply the filtering instruction to the preliminary response. Filtering can include regex-based redaction methods whereby regular expressions can be used to find and redact sensitive patterns in text. Patterns that can be filtered in this way include Social Security Numbers (SSNs), credit card numbers, phone numbers, emails, and/or birth dates of birth. Other filtering functions include named entity recognition redactions where natural language processing (NLP) models can be used to detect and remove personally identifiable information data (PII/PHI) from unstructured content.

For example, FIG. 6 is an example of a response 500, in accordance with embodiments herein. FIG. 6 indicates to the user that two sources were found to match the user's criteria "call_database_records_analytics_database" and "call_center_records." In the example of FIG. 6, the response summarizes the content of the databases. For example, the response includes that the criteria "call_database_records_analytics_database" "is a database storing device metrics relating to devices that experienced poor connectivity" while the criteria "call_center_records" "is a large database storing CDRs." However, as can be seen in FIG. 6, the user is not enabled to access the "call_center_records" so the portion of the response that shows a row from the data is redacted to remove the specific values. In some implementations, certain data fields can also be redacted or filtered.

According to some embodiments, a user can be restricted from access to a specific resource based on their current access level and/or other data in their user profile. However, through the filtered response, the user can be notified, through the response, of resources that fit the criteria but are not immediately accessible to them. In this case, the user can transmit a second query indicating that the resource is the one they need, which can trigger a process whereby an operator or administrator can receive a request to enable access (e.g., one-time access, promotion of access level, etc.).

For example, once the adaptive response and provisioning system 350 receives a second user query at the model to provision resources from a source of the plurality of sources from which the user device is not authorized to access data, the adaptive response and provisioning system 350 can identify an authorizing user based on access authorization data corresponding to the source. For example, the access authorization data can include user identifiers for administrators or operators. The adaptive response and provisioning system 350 can generate a request for authorization using configuration data corresponding to the second source and, through the communication module 352, can transmit the request to a device associated with the authorizing user.

The adaptive response and provisioning system 350 can monitor for further responses from the operator device. Once the adaptive response and provisioning system 350 receives, from the device associated with the authorizing user, approval for authorizing the user to access data from the second source, it can update the access authorization data of metadata corresponding to the source in response. Additionally, the adaptive response and provisioning system 350 can automatically trigger provisioning of the source at the original requesting device (e.g., user device 310).

If, instead, the adaptive response and provisioning system 350 receives, from the device associated with the authorizing user, an indication to prevent the user from accessing data from the second source, the system can input, as context to the model, the indication to prevent access and other sources of the subset of the plurality of sources, as well as the filtering instruction and obtain a second response indicating prevented access and prompting the user to select a different source. The communication module 352 can be used to cause display of the second response at the user device, e.g., by transmitting commands to the user device.

Flow Diagram

Figure 7:
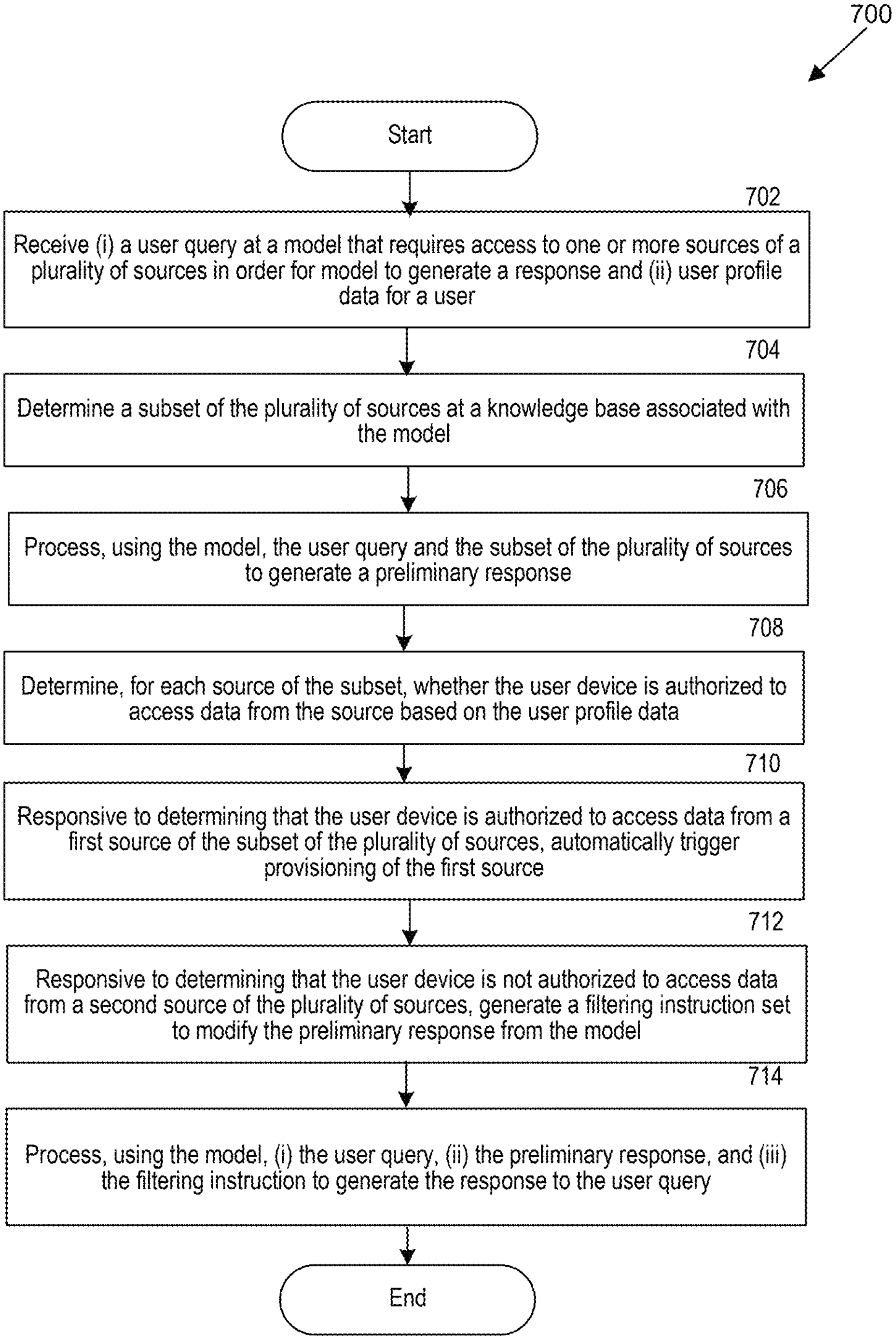
FIG. 7 is a flow diagram illustrating a process for adaptively generating a generative model response based on resource provision restrictions, in accordance with embodiments herein.

FIG. 7 is a flow diagram illustrating a process 700 for adaptive generative model response and resource provision, in accordance with embodiments herein. The process 700 begins at block 702 where a system (e.g., such as the adaptive response and provisioning system 350) receives (i) a user query at a model that requires access to one or more sources of a plurality of sources in order for the model to generate a response and (ii) user profile data for a user (as discussed above in reference to the communication module 352). For example, the user query can be received from a user device associated with the user.

At block 704, the process 700 includes determining a subset of the plurality of sources at a knowledge base associated with the model (as discussed above in reference to the source determination module 354). The process 700 then proceeds to block 706, where the system processes, using the model, the user query and the subset of the plurality of sources to generate a preliminary response (as discussed above in reference to the query processing module 356). At block 708, the process 700 determines, for each source of the subset, whether the user device is authorized to access data from the source based on the user profile data. At block 710, the system, responsive to determining that the user device is authorized to access data from a first source of the subset of the plurality of sources, can automatically trigger provisioning of the first source. The process 700 then proceeds to block 712, where the system, responsive to determining that the user device is not authorized to access data from a second source of the plurality of sources, can generate a filtering instruction to modify the preliminary response from the model. For example, steps 708, 710, and 712 can be performed as discussed above in reference to the authorization module 358.

The process 700 can include block 714 where the system performs processing, using the model, (i) the user query, (ii) the preliminary response, and (iii) the filtering instruction set to generate the response to the user query (as discussed above in reference to the response generation module 362). For example, the response can be configured to be displayed at the user device.

AI System

Figure 8:
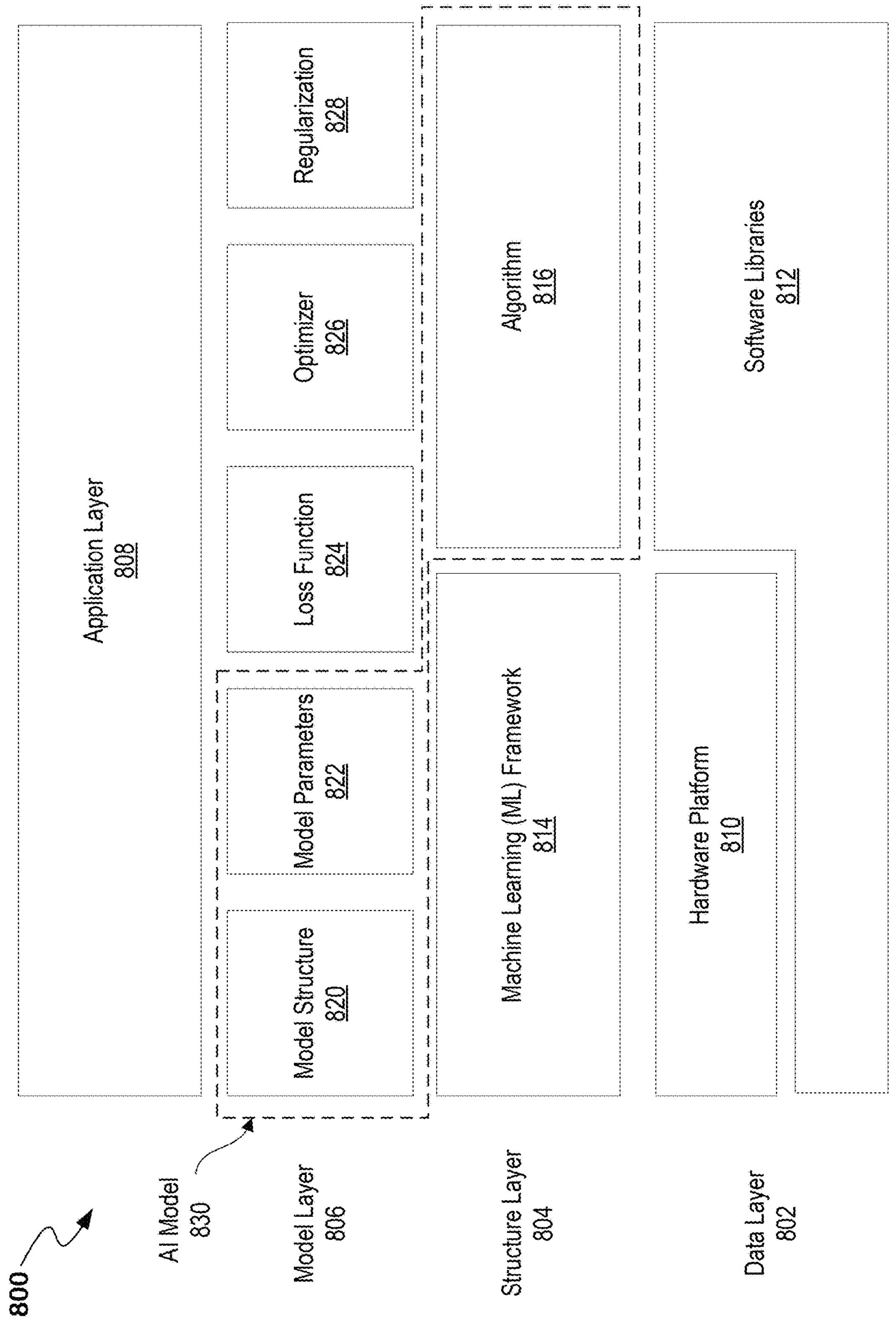
FIG. 8 is a high-level block diagram illustrating an example artificial intelligence (AI) system, in accordance with one or more implementations.

FIG. 8 is a block diagram illustrating an example AI system 800, in accordance with one or more implementations of this disclosure. The AI system 800 is implemented using components of the example computer system 1000 illustrated and described in more detail with reference to FIG. 10. For example, the AI system 800 can be implemented using the processor 1002 and instructions 1008 programmed in the main memory 1006 illustrated and described in more detail with reference to FIG. 10. Likewise, implementations of the AI system 800 can include different and/or additional components or be connected in different ways.

As shown, the AI system 800 can include a set of layers, which conceptually organize elements within an example network topology for the AI system's architecture to implement a particular AI model 830. Generally, an AI model 830 is a computer-executable program implemented by the AI system 800 that analyzes data to make predictions. Information can pass through each layer of the AI system 800 to generate outputs for the AI model 830. The layers can include a data layer 802, a structure layer 804, a model layer 806, and an application layer 808. The algorithm 816 of the structure layer 804 and the model structure 820 and model parameters 822 of the model layer 806 together form the example AI model 830. The loss function engine 824, optimizer 826, and regularization engine 828 work to refine and optimize the AI model 830, and the data layer 802 provides resources and support for application of the AI model 830 by the application layer 808.

The data layer 802 acts as the foundation of the AI system 800 by preparing data for the AI model 830. As shown, the data layer 802 can include two sub-layers: a hardware platform 810 and one or more software libraries 812. The hardware platform 810 can be designed to perform operations for the AI model 830 and can include computing resources for storage, memory, logic, and networking, such as the resources described in relation to FIG. 10. The hardware platform 810 can process amounts of data using one or more servers. The servers can perform backend operations such as matrix calculations, parallel calculations, machine learning (ML) training, and the like. Examples of servers used by the hardware platform 810 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but can be used for AI applications due to their vast computing and memory resources. GPUs use a parallel structure that generally makes their processing more efficient than that of CPUs. In some instances, the hardware platform 810 can include Infrastructure as a Service (IaaS) resources, which are computing resources (e.g., servers, memory, etc.) offered by a cloud services provider. The hardware platform 810 can also include computer memory for storing data about the AI model 830, application of the AI model 830, and training data for the AI model 830. The computer memory can be a form of random-access memory (RAM), such as dynamic RAM, static RAM, and non-volatile RAM.

The software libraries 812 can be thought of as suites of data and programming code, including executables, used to control the computing resources of the hardware platform 810. The programming code can include low-level primitives (e.g., fundamental language elements) that form the foundation of one or more low-level programming languages, such that servers of the hardware platform 810 can use the low-level primitives to carry out specific operations. The low-level programming languages do not require much, if any, abstraction from a computing resource's instruction set architecture, allowing them to run quickly with a small memory footprint. Examples of software libraries 812 that can be included in the AI system 800 include INTEL MATH KERNEL LIBRARY, NVIDIA cuDNN, EIGEN, and OPEN BLAS.

The structure layer 804 can include a machine learning (ML) framework 814 and an algorithm 816. The ML framework 814 can be thought of as an interface, library, or tool that allows users to build and deploy the AI model 830. The ML framework 814 can include an open-source library, an application programming interface (API), a gradient-boosting library, an ensemble method, and/or a deep learning toolkit that work with the layers of the AI system 800 to facilitate development of the AI model 830. For example, the ML framework 814 can distribute processes for application or training of the AI model 830 across multiple resources in the hardware platform 810. The ML framework 814 can also include a set of pre-built components that have the functionality to implement and train the AI model 830 and allow users to use pre-built functions and classes to construct and train the AI model 830. Thus, the ML framework 814 can be used to facilitate data engineering, development, hyperparameter tuning, testing, and training for the AI model 830.

Examples of ML frameworks 814 or libraries that can be used in the AI system 800 include TensorFlow, PyTorch, Scikit-Learn, Keras, and Cafffe. Random Forest is a machine learning algorithm that can be used within the ML frameworks 814. LightGBM is a gradient-boosting framework/algorithm (an ML technique) that can be used. Other techniques/algorithms that can be used are XGBoost, CatBoost, etc. Amazon Web Services (AWS) is a cloud service provider that offers various machine learning services and tools (e.g., Sage Maker) that can be used for platform building, training, and deploying ML models.

In some implementations, the ML framework 814 performs deep learning (also known as deep structured learning or hierarchical learning) directly on the input data to learn data representations, as opposed to using task-specific algorithms. In deep learning, no explicit feature extraction is performed; the features of a feature vector are implicitly extracted by the AI system 800. For example, the ML framework 814 can use a cascade of multiple layers of nonlinear processing units for implicit feature extraction and transformation. Each successive layer uses the output from the previous layer as input. The AI model 830 can thus learn in supervised (e.g., classification) and/or unsupervised (e.g., pattern analysis) modes. The AI model 830 can learn multiple levels of representations that correspond to different levels of abstraction, wherein the different levels form a hierarchy of concepts. In this manner, the AI model 830 can be configured to differentiate features of interest from background features.

The algorithm 816 can be an organized set of computer-executable operations used to generate output data from a set of input data and can be described using pseudocode. The algorithm 816 can include complex code that allows the computing resources to learn from new input data and create new/modified outputs based on what was learned. In some implementations, the algorithm 816 can build the AI model 830 through being trained while running computing resources of the hardware platform 810. This training allows the algorithm 816 to make predictions or decisions without being explicitly programmed to do so. Once trained, the algorithm 816 can run at the computing resources as part of the AI model 830 to make predictions or decisions, improve computing resource performance, or perform tasks. The algorithm 816 can be trained using supervised learning, unsupervised learning, semi-supervised learning, and/or reinforcement learning.

Using supervised learning, the algorithm 816 can be trained to learn patterns (e.g., map input data to output data) based on labeled training data. The training data can be labeled by an external user or operator. For instance, a user can collect a set of training data, such as by capturing user device performance metrics, device data, network data, historical communication sessions, and the like. The user can label the training data based on one or more classes and trains the AI model 830 by inputting the training data to the algorithm 816. The algorithm 816 determines how to label the new data based on the labeled training data. The user can facilitate collection, labeling, and/or input via the ML framework 814. In some instances, the user can convert the training data to a set of feature vectors for input to the algorithm 816. Once trained, the user can test the algorithm 816 on new data to determine whether the algorithm 816 is predicting accurate labels for the new data. For example, the user can use cross-validation methods to test the accuracy of the algorithm 816 and retrain the algorithm 816 on new training data if the results of the cross-validation are below an accuracy threshold.

Supervised learning can involve classification and/or regression. Classification techniques involve teaching the algorithm 816 to identify a category of new observations based on training data and are used when input data for the algorithm 816 is discrete. Said differently, when learning through classification techniques, the algorithm 816 receives training data labeled with categories (e.g., classes) and determines how features observed in the training data relate to the categories. Once trained, the algorithm 816 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques involve estimating relationships between independent and dependent variables and are used when input data to the algorithm 816 is continuous. Regression techniques can be used to train the algorithm 816 to predict or forecast relationships between variables. To train the algorithm 816 using regression techniques, a user can select a regression method for estimating the parameters of the model. The user collects and labels training data that is input to the algorithm 816 such that the algorithm 816 is trained to understand the relationship between data features and the dependent variable(s). Once trained, the algorithm 816 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill in missing data for machine learning-based pre-processing operations.

Under unsupervised learning, the algorithm 816 learns patterns from unlabeled training data. In particular, the algorithm 816 is trained to learn hidden patterns and insights of input data, which can be used for data exploration or for generating new data. Here, the algorithm 816 does not have a predefined output, unlike the labels output when the algorithm 816 is trained using supervised learning. Another way unsupervised learning is used to train the algorithm 816 to find an underlying structure of a set of data is by grouping the data according to similarities and representing that set of data in a compressed format. The network 100 disclosed herein with reference to FIG. 1 can use unsupervised learning to identify patterns in data received.

A few techniques can be used in supervised learning: clustering, anomaly detection, and techniques for learning latent variable models. Clustering techniques involve grouping data into different clusters that include similar data, such that other clusters contain dissimilar data. For example, during clustering, data with possible similarities remain in a group that has fewer or no similarities to another group. Examples of clustering techniques include density-based methods, hierarchical-based methods, partitioning methods, and grid-based methods. In one example, the algorithm 816 can be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 816 can be trained to be an Isolation Forest, local outlier factor (LOF) algorithm, or k-nearest neighbor (k-NN) algorithm. Latent variable techniques involve relating observable variables to a set of latent variables. These techniques assume that the observable variables are the result of an individual's position on the latent variables and that the observable variables have nothing in common after controlling for the latent variables. Examples of latent variable techniques that can be used by the algorithm 816 include factor analysis, item response theory, latent profile analysis, and latent class analysis.

In some implementations, the AI system 800 trains the algorithm 816 of the AI model 830, based on the training data, to correlate the feature vector to expected outputs in the training data. As part of the training of the AI model 830, the AI system 800 forms a training set of features and training labels by identifying a positive training set of features that have been determined to have a desired property in question, and, in some implementations, forms a negative training set of features that lack the property in question. The AI system 800 applies the ML framework 814 to train the AI model 830, which, when applied to the feature vector, outputs indications of whether the feature vector has an associated desired property or properties, such as a probability that the feature vector has a particular Boolean property, or an estimated value of a scalar property. The AI system 800 can further apply dimensionality reduction (e.g., via linear discriminant analysis (LDA), principal component analysis (PCA), or the like) to reduce the amount of data in the feature vector to a smaller, more representative set of data.

The model layer 806 implements the AI model 830 using data from the data layer 802 and the algorithm 816 and ML framework 814 from the structure layer 804, thus enabling decision-making capabilities of the AI system 800. The model layer 806 includes a model structure 820, model parameters 822, a loss function engine 824, an optimizer 826, and a regularization engine 828.

The model structure 820 describes the architecture of the AI model 830 of the AI system 800. The model structure 820 defines the complexity of the pattern/relationship that the AI model 830 expresses. Examples of structures that can be used as the model structure 820 include decision trees, support vector machines, regression analyses, Bayesian networks, Gaussian processes, genetic algorithms, and artificial neural networks (or, simply, neural networks). The model structure 820 can include a number of structure layers, a number of nodes (or neurons) at each structure layer, and activation functions of each node. Each node's activation function defines how the node converts data received to data output. The structure layers can include an input layer of nodes that receive input data, and an output layer of nodes that produce output data. The model structure 820 can include one or more hidden layers of nodes between the input and output layers. The model structure 820 can be an artificial neural network (or, simply, neural network) that connects the nodes in the structured layers such that the nodes are interconnected. Examples of neural networks include Feedforward Neural Networks, convolutional neural networks (CNNs), Recurrent Neural Networks (RNNs), Autoencoder, and Generative Adversarial Networks (GANs).

The model parameters 822 represent the relationships learned during training and can be used to make predictions and decisions based on input data. The model parameters 822 can weight and bias the nodes and connections of the model structure 820. For instance, when the model structure 820 is a neural network, the model parameters 822 can weight and bias the nodes in each layer of the neural network, such that the weights determine the strength of the nodes and the biases determine the thresholds for the activation functions of each node. The model parameters 822, in conjunction with the activation functions of the nodes, determine how input data is transformed into desired outputs. The model parameters 822 can be determined and/or altered during training of the algorithm 816.

The loss function engine 824 can determine a loss function, which is a metric used to evaluate the performance of the AI model 830 during training. For instance, the loss function engine 824 can measure the difference between a predicted output of the AI model 830 and the actual output of the AI model 830 and is used to guide optimization of the AI model 830 during training to minimize the loss function. The loss function can be presented via the ML framework 814, such that a user can determine whether to retrain or otherwise alter the algorithm 816 if the loss function is over a threshold. In some instances, the algorithm 816 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 826 adjusts the model parameters 822 to minimize the loss function during training of the algorithm 816. In other words, the optimizer 826 uses the loss function generated by the loss function engine 824 as a guide to determine what model parameters lead to the most accurate AI model 830. Examples of optimizers include Gradient Descent (GD), Adaptive Gradient Algorithm (AdaGrad), Adaptive Moment Estimation (Adam), Root Mean Square Propagation (RMSprop), Radial Base Function (RBF), and Limited-memory BFGS (L-BFGS). The type of optimizer 826 used can be determined based on the type of the model structure 820 and the size of data and the computing resources available in the data layer 802.

The regularization engine 828 executes regularization operations. Regularization is a technique that prevents over- and underfitting of the AI model 830. Overfitting occurs when the algorithm 816 is overly complex and too adapted to the training data, which can result in poor performance of the AI model 830. Underfitting occurs when the algorithm 816 is unable to recognize even basic patterns from the training data such that it cannot perform well on training data or on validation data. The regularization engine 828 can apply one or more regularization techniques to fit the algorithm 816 to the training data properly, which helps constrain the resulting AI model 830 and improves its ability for generalized application. Examples of regularization techniques include lasso (L1) regularization, ridge (L2) regularization, and elastic (L1 and L2) regularization.

In some implementations, the AI system 800 can include a feature extraction module implemented using components of the example computer system 1000 illustrated and described in more detail with reference to FIG. 10. In some implementations, the feature extraction module extracts a feature vector from input data. The feature vector includes n features (e.g., feature a, feature b, . . . , feature n). The feature extraction module reduces the redundancy in the input data, e.g., repetitive data values, to transform the input data into the reduced set of features such as a feature vector. The feature vector contains the relevant information from the input data, such that events or data value thresholds of interest can be identified by the AI model 830 by using this reduced representation. In some example implementations, the following dimensionality reduction techniques are used by the feature extraction module: independent component analysis, Isomap, kernel PCA, latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. A plurality of neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN may encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a language model), the training dataset may be a collection of text documents, referred to as a text corpus (or simply referred to as a corpus). The corpus may represent a language domain (e.g., a single language), a subject domain (e.g., scientific papers), and/or may encompass another domain or domains, be they larger or smaller than a single language or subject domain. For example, a relatively large, multilingual and non-subject-specific corpus may be created by extracting text from online webpages and/or publicly available social media posts. Training data may be annotated with ground truth labels (e.g., each data entry in the training dataset may be paired with a label), or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data may be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters may be determined based on the measured performance of one or more of the trained ML models, and the first step of training (i.e., with the training set) may begin again on a different ML model described by the new set of determined hyperparameters. In this way, these steps may be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin. The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (also referred to as update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (i.e., "learn") the parameters to reduce the loss function. Backpropagation is performed iteratively so that the loss function is converged or minimized. Other techniques for learning the parameters of the ML model may be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters may then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publically-available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to a ML-based language model, there could exist non-ML language models. In the present disclosure, the term "language model" may be used as shorthand for an ML-based language model (i.e., a language model that is implemented using a neural network or other ML architecture), unless stated otherwise. For example, unless stated otherwise, the "language model" encompasses LLMs.

A language model may use a neural network (typically a DNN) to perform natural language processing (NLP) tasks. A language model may be trained to model how words relate to each other in a textual sequence, based on probabilities. A language model may contain hundreds of thousands of learned parameters or in the case of a large language model (LLM) may contain millions or billions of learned parameters or more. As non-limiting examples, a language model can generate text, translate text, summarize text, answer questions, write code (e.g., Phyton, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

In recent years, there has been interest in a type of neural network architecture, referred to as a transformer, for use as language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as recurrent neural network (RNN)-based language models.

Figure 9:
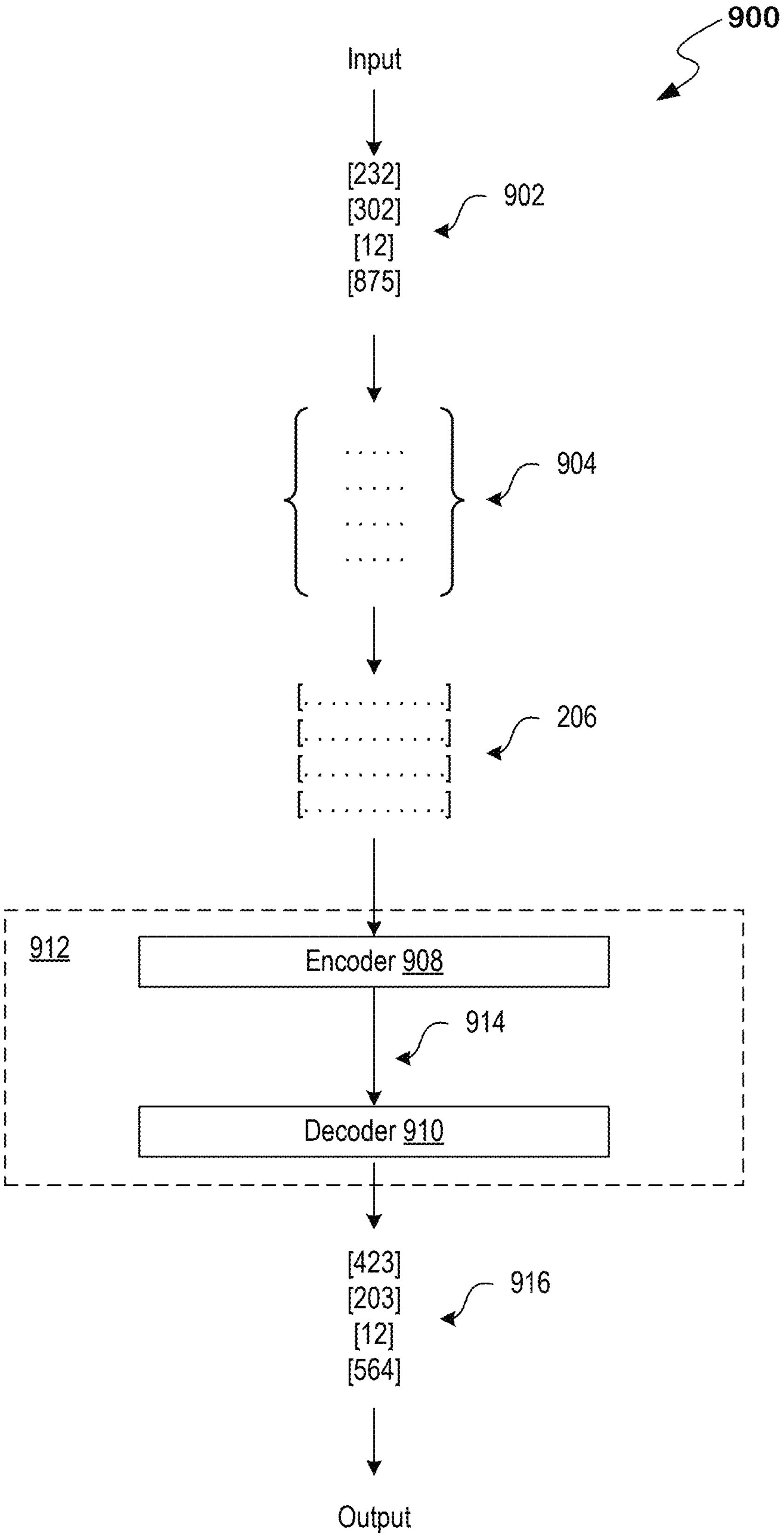
FIG. 9 is a diagram illustrating an example transformer, in accordance with embodiments herein.

FIG. 9 is a block diagram of an example transformer 912. A transformer is a type of neural network architecture that uses self-attention mechanisms to generate predicted output based on input data that has some sequential meaning (i.e., the order of the input data is meaningful, which is the case for most text input). Self-attention is a mechanism that relates different positions of a single sequence to compute a representation of the same sequence. Although transformer-based language models are described herein, it should be understood that the present disclosure may be applicable to any machine learning (ML)-based language model, including language models based on other neural network architectures such as recurrent neural network (RNN)-based language models.

The transformer 912 includes an encoder 908 (which can comprise one or more encoder layers/blocks connected in series) and a decoder 910 (which can comprise one or more decoder layers/blocks connected in series). Generally, the encoder 908 and the decoder 910 each include a plurality of neural network layers, at least one of which can be a self-attention layer. The parameters of the neural network layers can be referred to as the parameters of the language model.

The transformer 912 can be trained to perform certain functions on a natural language input. For example, the functions include summarizing existing content, brainstorming ideas, writing a rough draft, fixing spelling and grammar, and translating content. Summarizing can include extracting key points from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some embodiments, the transformer 912 is trained to perform certain functions on other input formats than natural language input. For example, the input can include objects, images, audio content, or video content, or a combination thereof.

The transformer 912 can be trained on a text corpus that is labeled (e.g., annotated to indicate verbs, nouns) or unlabeled. Large language models (LLMs) can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input). FIG. 9 illustrates an example of how the transformer 912 can process textual input data. Input to a language model (whether transformer-based or otherwise) typically is in the form of natural language that can be parsed into tokens. It should be appreciated that the term "token" in the context of language models and Natural Language Processing (NLP) has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some examples, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 9, a short sequence of tokens 902 corresponding to the input text is illustrated as input to the transformer 912. Tokenization of the text sequence into the tokens 902 can be performed by some pre-processing tokenization module such as, for example, a byte-pair encoding tokenizer (the "pre" referring to the tokenization occurring prior to the processing of the tokenized input by the LLM), which is not shown in FIG. 9 for simplicity. In general, the token sequence that is inputted to the transformer 912 can be of any length up to a maximum length defined based on the dimensions of the transformer 912. Each token 902 in the token sequence is converted into an embedding vector 906 (also referred to simply as an embedding 906). An embedding 906 is a learned numerical representation (such as, for example, a vector) of a token that captures some semantic meaning of the text segment represented by the token 902. The embedding 906 represents the text segment corresponding to the token 902 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 906 corresponding to the "write" token will be closer to another embedding corresponding to the "jot down" token in the vector space as compared to the distance between the embedding 906 corresponding to the "write" token and another embedding corresponding to the "summary" token.

The vector space can be defined by the dimensions and values of the embedding vectors. Various techniques can be used to convert a token 902 to an embedding 906. For example, another trained ML model can be used to convert the token 902 into an embedding 906. In particular, another trained ML model can be used to convert the token 902 into an embedding 906 in a way that encodes additional information into the embedding 906 (e.g., a trained ML model can encode positional information about the position of the token 902 in the text sequence into the embedding 906). In some examples, the numerical value of the token 902 can be used to look up the corresponding embedding in an embedding matrix 904 (which can be learned during training of the transformer 912).

The generated embeddings 906 are input into the encoder 908. The encoder 908 serves to encode the embeddings 906 into feature vectors 914 that represent the latent features of the embeddings 906. The encoder 908 can encode positional information (i.e., information about the sequence of the input) in the feature vectors 914. The feature vectors 914 can have very high dimensionality (e.g., on the order of thousands or tens of thousands), with each element in a feature vector 914 corresponding to a respective feature. The numerical weight of each element in a feature vector 914 represents the importance of the corresponding feature. The space of all possible feature vectors 914 that can be generated by the encoder 908 can be referred to as the latent space or feature space.

Conceptually, the decoder 910 is designed to map the features represented by the feature vectors 914 into meaningful output, which can depend on the task that was assigned to the transformer 912. For example, if the transformer 912 is used for a translation task, the decoder 910 can map the feature vectors 914 into text output in a target language different from the language of the original tokens 902. Generally, in a generative language model, the decoder 910 serves to decode the feature vectors 914 into a sequence of tokens. The decoder 910 can generate output tokens 916 one by one. Each output token 916 can be fed back as input to the decoder 910 in order to generate the next output token 916. By feeding back the generated output and applying self-attention, the decoder 910 is able to generate a sequence of output tokens 916 that has sequential meaning (e.g., the resulting output text sequence is understandable as a sentence and obeys grammatical rules). The decoder 910 can generate output tokens 916 until a special [EOT] token (indicating the end of the text) is generated. The resulting sequence of output tokens 916 can then be converted to a text sequence in post-processing. For example, each output token 916 can be an integer number that corresponds to a vocabulary index. By looking up the text segment using the vocabulary index, the text segment corresponding to each output token 916 can be retrieved, the text segments can be concatenated together, and the final output text sequence can be obtained.

In some examples, the input provided to the transformer 912 includes instructions to perform a function on an existing text. In some examples, the input provided to the transformer includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text. For example, the input can include the question "What is the weather like in Australia?" and the output can include a description of the weather in Australia.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available to the public online. GPT-3 has a very large number of learned parameters (on the order of hundreds of billions), is able to accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as, for example, the Internet. In some implementations, such as, for example, potentially in the case of a cloud-based language model, a remote language model can be hosted by a computer system that can include a plurality of cooperating (e.g., cooperating via a network) computer systems that can be in, for example, a distributed arrangement. Notably, a remote language model can employ a plurality of processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of a plurality of processors/cooperating computing devices as discussed above.

Inputs to an LLM can be referred to as a prompt, which is a natural language input that includes instructions to the LLM to generate a desired output. A computer system can generate a prompt that is provided as input to the LLM via its API. As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Computer System

Figure 10:
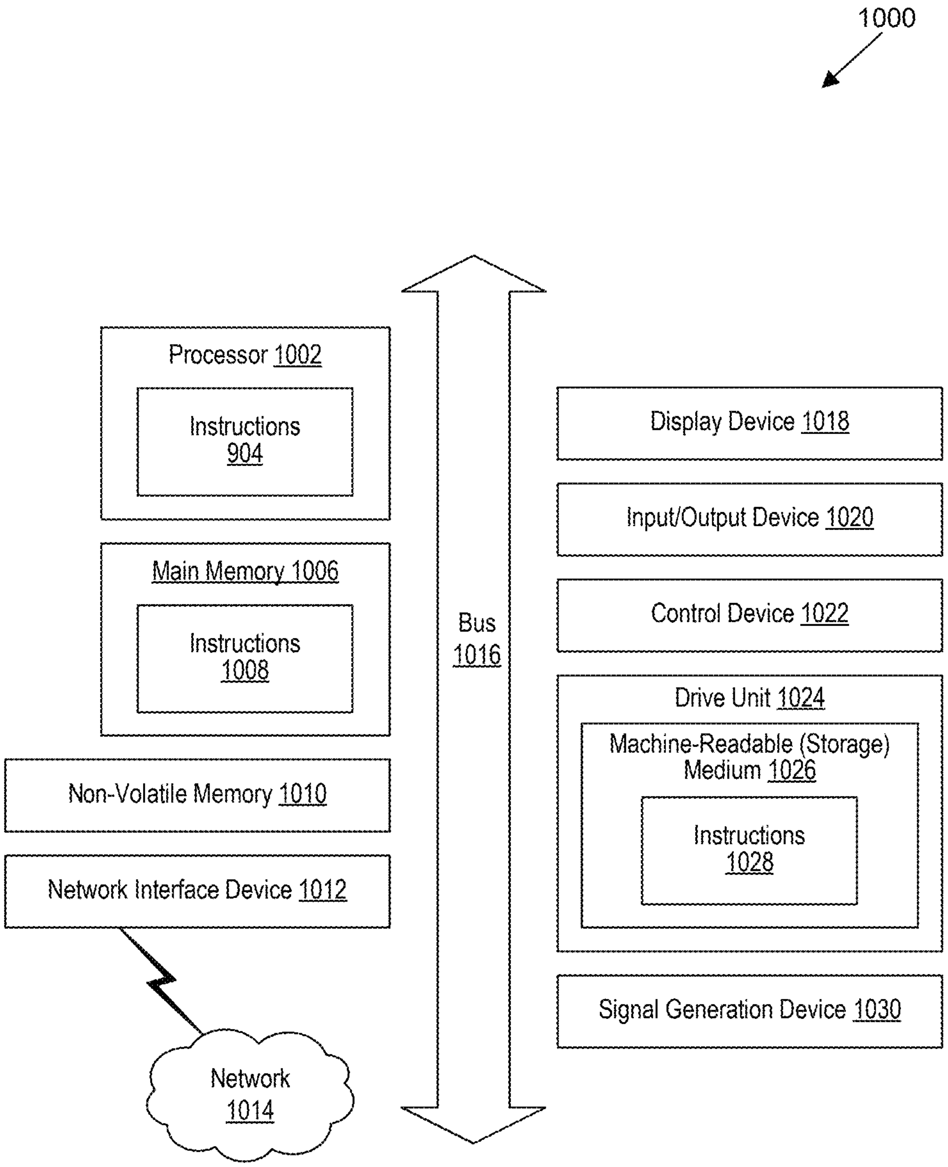
FIG. 10 is a block diagram illustrating an example of a computer system in which at least some operations described herein can be implemented.

FIG. 10 is a block diagram that illustrates an example of a computer system 1000 in which at least some operations described herein can be implemented. As shown, the computer system 1000 can include: one or more processors 1002, main memory 1006, non-volatile memory 1010, a network interface device 1012, a video display device 1018, an input/output device 1020, a control device 1022 (e.g., keyboard and pointing device), a drive unit 1024 that includes a machine-readable (storage) medium 1026, and a signal generation device 1030 that are communicatively connected to a bus 1016. The bus 1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computing system 1000 shares a similar architecture as that of a server computer, PC, tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computing system 1000. In some implementations, the computer system 1000 can be an embedded computer system, a system-on-chip (SOC), a single-board computer (SBC) system, or a distributed system such as a mesh of computer systems, or include one or more cloud components in one or more networks. Where appropriate, one or more computer systems 1000 can perform operations in real time, near real time, or in batch mode.

The network interface device 1012 enables the computing system 1000 to mediate data in a network 1014 with an entity that is external to the computing system 1000 through any communication protocol supported by the computing system 1000 and the external entity. Examples of the network interface device 1012 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1006, non-volatile memory 1010, machine-readable (storage) medium 1026) can be local, remote, or distributed. Although shown as a single medium, the machine-readable (storage) medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computing system 1000. The machine-readable (storage) medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 1010, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1004, 1008) set at various times in various memory and storage devices in computing device(s). When read and executed by the processor 1002, the instruction(s) cause the computing system 1000 to perform operations to execute elements involving the various aspects of the disclosure.

1. Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system for adaptively producing a generative model response based on resource provisioning-based restrictions, the system comprising:
- one or more processors; and
- one or more non-transitory, computer readable media comprising instructions that, when executed by the one or more processors, cause operations comprising:
  - receiving (i) from a user device a user query at a generative machine learning model, wherein the generative machine learning model requires access to one or more sources of a plurality of sources in order for the generative machine learning model to generate a response and (ii) user profile data for a user associated with the user device, and wherein the generative machine learning model is configured to access a knowledge base using retrieval augmented generation (RAG);
  - determining a subset of the plurality of sources at the knowledge base associated with the generative machine learning model, wherein each source of the subset of the plurality of sources comprises information required to generate the response to the user query;
  - processing, using the generative machine learning model, the user query, and the subset of the plurality of sources to generate a preliminary response;
  - accessing metadata for each of the subset of the plurality of sources, wherein the metadata comprises access authorization data and configuration data;
  - determining, for each source of the subset, whether the user device is authorized to access data from the source by comparing the user profile data to the access authorization data;
  - responsive to determining that the user device is authorized to access data from a first source of the subset of the plurality of sources, automatically triggering provisioning of the first source at the user device;
  - responsive to determining that the user device is not authorized to access data from a second source of the plurality of sources, generating a filtering instruction set to modify the preliminary response from the generative machine learning model to exclude information from the second source;
  - processing, using the generative machine learning model, (i) the user query, (ii) the preliminary response, and (iii) the filtering instruction set to generate the response to the user query, wherein the response is configured to be displayed at the user device;
  - receiving an indication to prevent the user from accessing data from the second source; and
  - responsive to receiving the indication, providing the indication to prevent access as context to a machine learning model, and obtaining a second response indicating prevention of access and prompting the user to select a different source, wherein the second response is configured to be displayed at the user device.

2. The system of claim 1, wherein the operations further comprise:
- receiving a second user query at a machine learning model to provision resources from the second source of the plurality of sources from which the user device is not authorized to access data;
- identifying an authorizing user based on the access authorization data corresponding to the second source;
- generating a request for authorization using the configuration data corresponding to the second source; and
- transmitting the request to a device associated with the authorizing user.

3. The system of claim 2, wherein the operations further comprise:
- receiving, from the device associated with the authorizing user, approval for authorizing the user for accessing data from the second source;
- responsive to receiving the approval, updating the access authorization data of the metadata for the second source; and
- automatically triggering provisioning of the second source at the user device.

4. The system of claim 2, wherein obtaining the second response comprises:
- providing, as context to the machine learning model, other sources of the subset of the plurality of sources and the filtering instruction.

5. The system of claim 1, wherein the filtering instruction for applying a function for modifying the response comprises a negative prompt for redacting personal identifiable information.

6. A method for adaptively producing a model response based on resource provisioning restrictions, the method comprising:
- receiving (i) from a user device a user query at a model that requires access to one or more sources of a plurality of sources in order for model to generate a response and (ii) user profile data for a user, wherein the model is configured to access a knowledge base using retrieval augmented generation (RAG);

determining a subset of the plurality of sources at a knowledge base associated with the model, wherein each source of the subset of the plurality of sources comprises information required to generate the response to the user query;

processing, using the model, the user query and the subset of the plurality of sources to generate a preliminary response;

determining, for each source of the subset, whether the user device is authorized to access data from the source based on the user profile data;

responsive to determining that the user device is authorized to access data from a first source of the subset of the plurality of sources, automatically triggering provisioning of the first source at the user device;

responsive to determining that the user device is not authorized to access data from a second source of the plurality of sources, generating a filtering instruction to modify the preliminary response from the model to exclude information from the second source;

processing, using the model, (i) the user query, (ii) the preliminary response, and (iii) the filtering instruction set to generate the response to the user query, wherein the response is configured to be displayed at the user device;

receiving an indication to prevent the user from accessing data from the second source; and responsive to receiving the indication, providing the indication to prevent access as context to a machine learning model, and obtaining a second response indicating prevention of access and prompting the user to select a different source, wherein the second response is configured to be displayed at the user device.

7. The method of claim 6, wherein the method further comprises accessing metadata for each of the subset of the plurality of sources, wherein the metadata comprises access authorization data and configuration data and wherein determining whether the user device is authorized to access data from each source further comprises comparing the user profile data to the access authorization data.

8. The method of claim 6, wherein the method further comprises:

receiving a second user query at the model to provision resources from the second source of the plurality of sources from which the user device is not authorized to access data;

identifying an authorizing user based on access authorization data corresponding to the second source;

generating a request for authorization using configuration data corresponding to the second source; and transmitting the request to a device associated with the authorizing user.

9. The method of claim 8, further comprising:

receiving, from the device associated with the authorizing user, approval for authorizing the user for accessing data from the second source;

responsive to receiving the approval, updating the access authorization data of metadata corresponding to the second source; and automatically triggering provisioning of the second source at the user device.

10. The method of claim 8, wherein obtaining the second response comprises:

providing, as context to the model, other sources of the subset of the plurality of sources and the filtering instruction.

11. The method of claim 6, wherein the model is a large language model.

12. The method of claim 6, wherein the filtering instruction for applying a function for modifying the model response comprises a negative prompt for redacting personal identifiable information.

13. One or more non-transitory, computer-readable media storing instructions thereon, where the instructions when executed by one or more processors cause operations comprising:

receiving (i) from a user device a user query at a model that requires access to one or more sources of a plurality of sources in order for model to generate a response and (ii) user profile data for a user, wherein the model is configured to access a knowledge base using retrieval augmented generation (RAG);

determining a subset of the plurality of sources at a knowledge base associated with the model, wherein each source of the subset of the plurality of sources comprises information required to generate the response to the user query;

processing, using the model, the user query and the subset of the plurality of sources to generate a preliminary response;

determining, for each source of the subset, whether the user device is authorized to access data from the source based on the user profile data;

responsive to determining that the user device is authorized to access data from a first source of the subset of the plurality of sources, automatically triggering provisioning of the first source at the user device;

responsive to determining that the user device is not authorized to access data from a second source of the plurality of sources, generating a filtering instruction to modify the preliminary response from the model to exclude information from the second source;

receiving an indication to prevent the user from accessing data from the second source; and responsive to receiving the indication, providing the indication to prevent access as context to a machine learning model, and obtaining a second response indicating prevention of access and prompting the user to select a different source, wherein the second response is configured to be displayed at the user device.

14. The one or more non-transitory, computer-readable media of claim 13, wherein the operations further comprise providing, as context to the model, (i) the user query, (ii) the subset of the plurality of sources, and (iii) the filtering instruction and obtaining, as output, a response.

15. The one or more non-transitory, computer-readable media of claim 13, wherein the operations further comprise:

accessing metadata for each of the subset of the plurality of sources, wherein the metadata comprises access authorization data and configuration data and wherein determining whether the user device is authorized to access data from each source further comprises comparing the user profile data to the access authorization data.

16. The one or more non-transitory, computer-readable media of claim 13, wherein the operations further comprise:

receiving a second user query at the model to provision resources from the second source of the plurality of sources from which the user device is not authorized to access data;

identifying an authorizing user based on access authorization data corresponding to the second source;

generating a request for authorization using configuration data corresponding to the second source; and transmitting the request to a device associated with the authorizing user.

17. The one or more non-transitory, computer-readable media of claim 16, wherein the operations further comprise:

receiving, from the device associated with the authorizing user, approval for authorizing the user for accessing data from the second source;

responsive to receiving the approval, updating the access authorization data of metadata for the second source; and automatically triggering provisioning of the second source at the user device.

18. The one or more non-transitory, computer-readable media of claim 16, wherein obtaining the second response comprises:

providing, as context to the model, other sources of the subset of the plurality of sources and the filtering instruction.

19. The one or more non-transitory, computer-readable media of claim 13, wherein the model is a large language model.

20. The one or more non-transitory, computer-readable media of claim 13, wherein the filtering instruction for applying a function for modifying the preliminary response comprises a negative prompt for redacting personal identifiable information.

* * * * *